(12) United States Patent
Abe et al.

(10) Patent No.: US 10,411,232 B2
(45) Date of Patent: Sep. 10, 2019

(54) SECONDARY BATTERY (71) Applicant: TOYOTA JIDOSHA KABUSHIKI KAISHA, Toyota-shi, Aichi (JP)

(72) Inventors: Takeshi Abe, Toyota (JP); Ryuta Sugiura, Toyota (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 0 days.

(21) Appl. No.: 15/501,513

(22) PCT Filed: Jul. 6, 2015

(86) PCT No.: PCT/JP2015/003385
§ 371 (c)(1),
(2) Date: Feb. 3, 2017

(87) PCT Pub. No.: WO2016/027403
PCT Pub. Date: Feb. 25, 2016

(65) Prior Publication Data
US 2017/0229693 A1  Aug. 10, 2017

(30) Foreign Application Priority Data

Aug. 20, 2014 (JP) .................................. 2014-167899

(51) Int. Cl.
*H01M 2/12* (2006.01)
*H01M 10/0525* (2010.01)
(Continued)

(52) U.S. Cl.
CPC ........... *H01M 2/12* (2013.01); *H01M 2/1264* (2013.01); *H01M 4/36* (2013.01); *H01M 4/362* (2013.01);
(Continued)

(58) Field of Classification Search
None
See application file for complete search history.

(56) References Cited

U.S. PATENT DOCUMENTS

2008/0038628 A1* 2/2008 Yamauchi ............... H01M 2/12
429/56
2008/0226982 A1* 9/2008 Schubert .................. C09K 3/10
429/185
(Continued)

FOREIGN PATENT DOCUMENTS

CN         102263292 A    11/2011
JP       2002-158008 A     5/2002
(Continued)

OTHER PUBLICATIONS

DERWENT English abstract for JP2003-217549 (2003).*
(Continued)

*Primary Examiner* — Sin J Lee
(74) *Attorney, Agent, or Firm* — Sughrue Mion, PLLC (57) ABSTRACT

A non-aqueous electrolyte secondary battery (10) proposed herein includes an electrode assembly (40), an electrolyte solution (80), and a battery case (20). The battery case (20) accommodates the electrode assembly (40) and the electrolyte solution (80). A membrane (201) capable of selectively releasing a hydrogen gas is provided on a portion of the battery case (20) so as to separate the interior and the exterior of the battery case (20).

17 Claims, 5 Drawing Sheets

(51) Int. Cl.
  *H01M 10/0569* (2010.01)
  *H01M 4/36* (2006.01)
(52) U.S. Cl.
  CPC ....... *H01M 4/366* (2013.01); *H01M 10/0525* (2013.01); *H01M 10/0569* (2013.01)

(56) References Cited

U.S. PATENT DOCUMENTS

| | | | | |
|---|---|---|---|---|
| 2010/0062344 | A1* | 3/2010 | Koh | H01M 10/052 429/330 |
| 2013/0071733 | A1* | 3/2013 | Abe | H01G 11/58 429/200 |
| 2016/0079629 | A1* | 3/2016 | Abe | H01M 10/052 429/331 |
| 2016/0240848 | A1* | 8/2016 | Asano | H01M 4/505 |

FOREIGN PATENT DOCUMENTS

| | | | |
|---|---|---|---|
| JP | 2003-059462 | A | 2/2003 |
| JP | 2003-217549 | * | 7/2003 |
| JP | 2003-297325 | A | 10/2003 |
| JP | 2004-165128 | A | 6/2004 |
| JP | 2004-228019 | A | 8/2004 |
| JP | 2012-190639 | A | 10/2012 |
| JP | 2014-022329 | A | 2/2014 |
| KR | 10-2013-0116513 | A | 10/2013 |

OTHER PUBLICATIONS

Machine-assisted English translation of JP2003-217549 provided by JPO (2003).*
DERWENT English abstract for JP2002-158008 (2002).*
DERWENT English abstract for KR 2007091877 A (2007).*
Machine English translation of JP2004/165128.*
International Search Report of PCT/JP2015/003385, dated Aug. 19, 2015. [PCT/ISA/210].
Written Opinion of PCT/JP2015/003385, dated Aug. 19, 2015. [PCT/ISA/237].

* cited by examiner

Proportion of generated gases

SECONDARY BATTERY

CROSS REFERENCE TO RELATED APPLICATIONS

This application is a National Stage of International Application No. PCT/JP2015/003385 filed Jul. 6, 2015, claiming priority based on Japanese Patent Application No. 2014-167899, filed Aug. 20, 2014, the contents of all of which are incorporated herein by reference in their entirety.

TECHNICAL FIELD

The present invention relates to secondary batteries. In the present description, the term "secondary battery" refers to a rechargeable storage device in general, which encompasses what is called storage batteries, such as lithium secondary batteries (typically lithium-ion secondary batteries) and nickel-metal hydride batteries. The term "non-aqueous electrolyte secondary battery" refers to a secondary battery using a non-aqueous electrolyte (such as a non-aqueous electrolyte solution) as its electrolyte (or electrolyte solution). In the present description, the term "active material" refers to a substance capable of reversibly absorbing and releasing (typically inserting and deinserting) a chemical species that serves as a charge carrier (e.g., lithium ions in the case of lithium-ion secondary batteries) in secondary batteries.

The present application claims priority from Japanese Patent Application No. 2014-167899, filed with the Japan Patent Office on Aug. 20, 2014. The entire contents of the application are incorporated herein by reference.

BACKGROUND ART

For example, paragraph [0003] of JP 2012-190639 A (Patent Literature 1) describes the following. The non-aqueous electrolyte battery, in which the electrolyte solution is composed of a non-aqueous electrolyte, undergoes a deterioration of battery performance when water vapor enters the inside of the battery. On the other hand, gases, such as hydrogen and carbon dioxide gases, are generated by the decomposition of the electrolyte solution during charge and discharge, or when overcharged, or when stored at high-temperature, causing the battery case of the non-aqueous electrolyte secondary battery to swell. This publication proposes that a selective permeation part formed of a fluorine-based resin that allows carbon dioxide to permeate while restricting permeation of water vapor is provided on a battery case of the non-aqueous electrolyte secondary battery (see claim 1). The publication mentions that the "fluorine-based resin" may be polychlorotrifluoroethylene (PCTFE), polytetrafluoroethylene (PTFE), and ethylene-tetrafluoroethylene copolymer (ETFE) (see claim 5).

Specific examples of the positive electrode active material of the non-aqueous electrolyte secondary battery that are listed in this publication are lithium-containing composite oxides, such as $LiCoO_2$, $LiNiO_2$, $LiMn_2O_4$, and $LiNi_yCo_{1-y}O_2$ (0<y<1). In addition, it is stated that it is also possible to use a solid solution in which part of the transition metal element is substituted by another element, and that examples thereof include $LiNi_{0.5}Co_{0.5}O_2$ and $LiNi_{0.8}Co_{0.2}O_2$ (see paragraph [0021]). Moreover, it is stated that, in the case of the lithium-ion secondary battery described therein, the overcharge detection voltage is set to 4.20 V±0.05 V, and the overdischarge detection voltage is set to 2.4 V±0.1 V (see paragraph [0086]).

In addition, JP 2002-158008 A (Patent Literature 2), for example, discloses a non-aqueous electrolyte secondary battery in which the maximum operating potential of the positive electrode is 4.5 V or higher versus metallic lithium.

CITATION LIST

Patent Literature

[PLT 1] JP 2012-190639 A
[PLT 2] JP 2002-158008 A

SUMMARY OF INVENTION

Technical Problem

The present inventors have conducted assiduous research on practical problems with the non-aqueous electrolyte secondary battery having a maximum operating potential of the positive electrode of 4.3 V or higher versus metallic lithium. In the course of the research, the present inventors discovered that such a non-aqueous electrolyte secondary battery can cause an event in which gases gradually accumulate inside the battery. Such an event is more likely to occur when the maximum operating potential of the positive electrode is higher. For example, the event in which the battery internal pressure gradually increases occurs more conspicuously in a non-aqueous electrolyte secondary battery having a maximum operating potential of the positive electrode of nearly 5.0 V versus metallic lithium (what is commonly called a 5 V class non-aqueous electrolyte secondary battery).

In contrast, Patent Literature 1 merely discloses that, for a non-aqueous electrolyte secondary battery having a maximum operating potential of the positive electrode of less than 4.2 V versus metallic lithium, a selective permeation part formed of a fluorine-based resin that allows carbon dioxide to permeate while restricting permeation of water vapor is provided on the battery case of the non-aqueous electrolyte secondary battery.

Moreover, Patent Literature 2 does not disclose anything about the gradual increase of the battery internal pressure or its causes, regarding the non-aqueous electrolyte secondary battery in which the maximum operating potential of the positive electrode is 4.5 V or higher versus metallic lithium.

Solution to Problem

A non-aqueous electrolyte secondary battery proposed herein includes an electrode assembly, an electrolyte solution, and a battery case. The battery case accommodates the electrode assembly and the electrolyte solution. The battery case includes a membrane provided on a portion of the battery case so as to separate an interior and an exterior of the battery case. The membrane is capable of selectively releasing hydrogen gas. In this case, the non-aqueous electrolyte secondary battery can release hydrogen gas appropriately. As a result, the increase of the internal pressure of the non-aqueous electrolyte secondary battery can be kept low in such an event that the internal pressure gradually increases because of the generation of hydrogen gas inside the battery case.

The non-aqueous electrolyte secondary battery proposed herein is suitable when the electrode assembly contains a positive electrode active material having an operating potential of 4.3 V or higher versus metallic lithium, and the electrolyte solution contains an organic solvent. In such a non-aqueous electrolyte secondary battery having a positive electrode with a high operating potential, there is a tendency that the internal pressure gradually increases because of the generation of hydrogen gas inside the battery case. Because the above-described membrane is provided in the portion of the battery case, the increase of the internal pressure of the non-aqueous electrolyte secondary battery can be kept low. In particular, the event in which the battery internal pressure gradually increases occurs more conspicuously in what is called a 5 V class non-aqueous electrolyte secondary battery. In such an event, the non-aqueous electrolyte secondary battery proposed herein can keep the increase of the battery internal pressure low.

Here, the membrane may be fitted to a metal ring. In this case, it is desirable that the battery case be made of a metal. It is possible that the battery case may have a through-hole for receiving a membrane assembly fitted with the metal ring, and that in the battery case, the metal ring of the membrane assembly may be fitted in the through-hole, and the metal ring may be joined to an edge portion of the through-hole. The joining may be achieved by welding, for example.

In this case, the membrane assembly may include a sealing member. It is desirable that the sealing member covers the entire circumference of the edge of the membrane, and that the metal ring be fitted so as to cover the outer circumferential surface of the sealing member. In this case, it is possible that the metal ring may have a groove in its radially inner side surface, and the sealing member covering the edge of the membrane may be fitted to the groove. The sealing member may include a fluororesin.

It is also possible that the membrane may be a chemical separation type membrane for separating hydrogen molecules into protons and allowing the separated protons to permeate. In this case, it is possible that the membrane may be a palladium alloy membrane or a niobium alloy membrane. It is also possible that the membrane may be a molecular sieve type membrane that allows hydrogen gas to permeate but does not allow oxygen gas, nitrogen gas, and carbon monoxide gas to permeate. In this case, the membrane may preferably be a zeolite membrane or a silica membrane.

Herein, it is desirable that the positive electrode active material contain at least one active material selected from the group consisting of a spinel lithium-nickel-manganese composite oxide, a layered lithium-manganese composite oxide, and an olivine lithium transition metal phosphate compound. It is desirable that the electrolyte solution contain fluorine, for example.

DESCRIPTION OF EMBODIMENTS

The following description is given to illustrate an example of the embodiments of a secondary battery proposed herein. The embodiments described herein are not intended to limit the present invention. The drawings are depicted schematically, and the dimensional relationship (length, width, thickness, and the like) in the drawings, for example, does not necessarily reflect actual dimensional relationship. The parts and components that exhibit the same effects are denoted by the same reference symbols, and repetitive description thereof may be omitted as appropriate.

<<Example of the Structure of Non-Aqueous Electrolyte Secondary Battery 10>>

Figure 1:
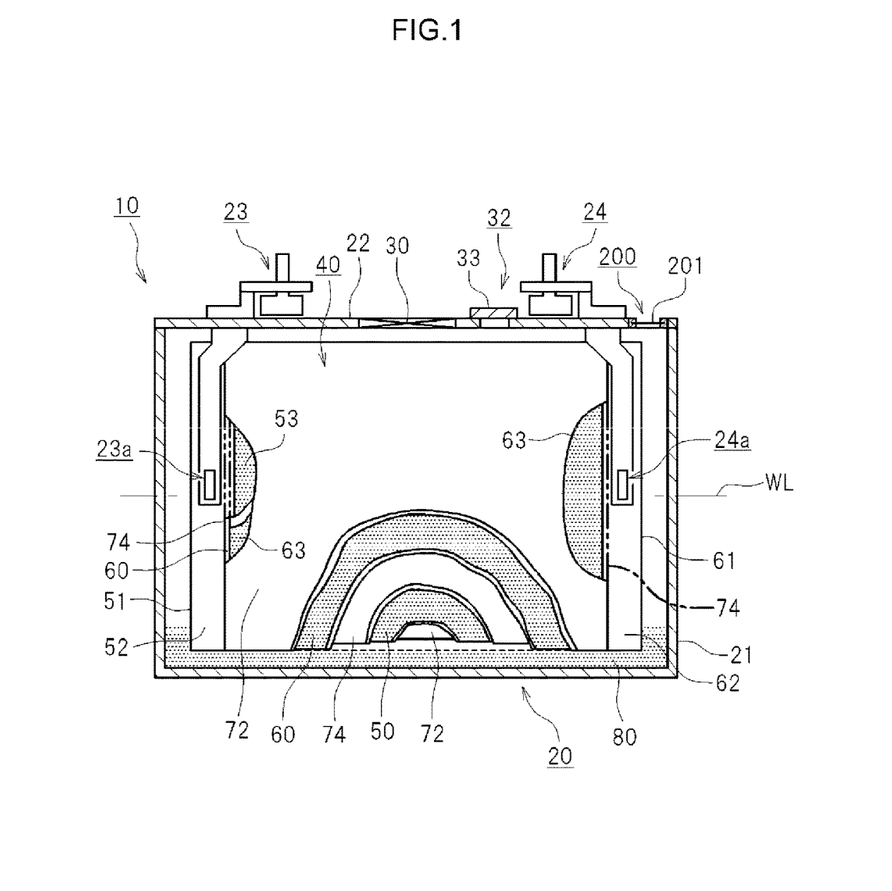
FIG. 1 is a cross-sectional view illustrating a non-aqueous electrolyte secondary battery 10.
Figure 2:
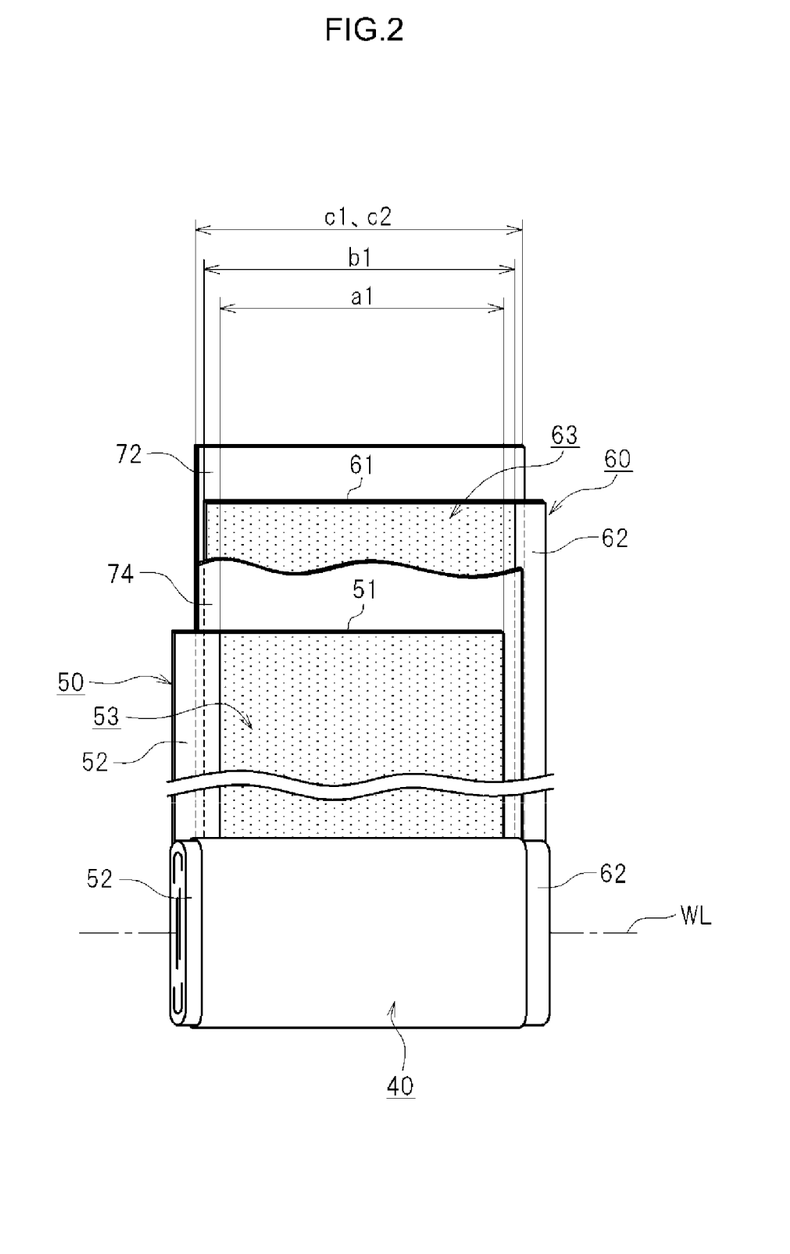
FIG. 2 is a view illustrating an electrode assembly 40 incorporated in the non-aqueous electrolyte secondary battery 10.

Here, an example of the structure of non-aqueous electrolyte secondary battery 10 will be described first. FIG. 1 is a cross-sectional view illustrating the non-aqueous electrolyte secondary battery 10. FIG. 2 is a view illustrating an electrode assembly 40 incorporated in the non-aqueous electrolyte secondary battery 10. It should be noted that the non-aqueous electrolyte secondary battery 10 depicted in FIGS. 1 and 2 merely illustrates an example of the non-aqueous electrolyte secondary battery to which the present invention can be applied. The structure illustrated herein does not limit the non-aqueous electrolyte secondary battery to which the present invention can be applied, unless otherwise stated. Herein, the non-aqueous electrolyte secondary battery 10 is described using a lithium-ion secondary battery as an example. The non-aqueous electrolyte secondary battery 10 may also be referred to as a lithium-ion secondary battery 10 as appropriate herein. As illustrated in FIG. 1, the non-aqueous electrolyte secondary battery 10 has a battery case 20 and an electrode assembly 40 (wound electrode assembly in FIG. 1).

<Battery Case 20>

The battery case 20 has a case main body 21 and a sealing plate 22. The case main body 21 has a box shape one end of which has an opening. The case main body 21 has a closed-bottom rectangular parallelepiped shape. The one face of the rectangular parallelepiped shape, which corresponds to the upper face of the non-aqueous electrolyte secondary battery 10 in the condition of normal use, is open. In this embodiment, a rectangular opening is formed in the case main body 21. The sealing plate 22 is a member for closing the opening of the case main body 21. The sealing plate 22 is composed of a substantially rectangular plate. The sealing plate 22 is welded to the peripheral edge of the opening of the case main body 21 to form the battery case 20 in a substantially hexahedral shape. For the material of the battery case 20, it is preferable to use mainly a lightweight and highly conductive metal material, for example. Examples of such a metal material include aluminum, stainless steel, and nickel-plated steel. Although a rectangular case is illustrated as an example herein, the battery case 20 does not necessarily need to have such a shape. For example, the battery case 20 may be a cylindrically shaped case. Moreover, the battery case 20 may be a pouch-like form that wraps the electrode assembly, and it may be what is called a laminate-type battery case 20.

In the example shown in FIG. 1, a positive electrode terminal 23 (external terminal) for external connection and a negative electrode terminal 24 (external terminal) are attached to the sealing plate 22. The sealing plate 22 has a safety vent 30 and a filling port 32. The safety vent 30 is so constructed that the internal pressure of the battery case 20 can be released when the internal pressure increases to a predetermined level or higher (for example, the designed valve opening pressure is from about 0.3 MPa to about 1.0 MPa). FIG. 1 illustrates the battery in which the filling port 32 is sealed by a sealing material 33 after an electrolyte solution 80 has been filled therein. The battery case 20 as described above accommodates the electrode assembly 40. In the example shown in FIG. 1, a membrane assembly 200 having a membrane 201 is provided. The details of the membrane 201 and the membrane assembly 200 will be described later.

<<Electrode Assembly 40 (Wound Electrode Assembly)>>

As illustrated in FIG. 2, the electrode assembly 40 has a strip-shaped positive electrode (positive electrode sheet 50), a strip-shaped negative electrode (negative electrode sheet 60), and strip-shaped separators (separators 72 and 74).

<Positive Electrode Sheet 50>

The positive electrode sheet 50 has a strip-shaped positive electrode current collector foil 51 and a positive electrode active material layer 53. A metal foil suitable for the positive electrode may be used preferably for the positive electrode current collector foil 51. For the positive electrode current collector foil 51, it is possible to use, for example, a strip-shaped aluminum foil having a predetermined width and a thickness of about 15 µm. An exposed portion 52 is provided along one lateral-side edge of the positive electrode current collector foil 51. In the example shown in the figure, the positive electrode active material layer 53 is formed on both faces of the positive electrode current collector foil 51 except for the exposed portion 52 provided along one lateral-side edge of the positive electrode current collector foil 51.

For the positive electrode active material, it is possible to use any conventional substance that can be used for the non-aqueous electrolyte secondary battery 10, either alone or in combination, without any particular limitation. The positive electrode active material is used, for example, in particulate form, and may be referred to as positive electrode active material particles as appropriate. Herein, the non-aqueous electrolyte secondary battery 10 is a non-aqueous electrolyte secondary battery having a maximum operating potential of the positive electrode of 4.3 V or higher versus metallic lithium. Preferable examples of the positive electrode active material for such a non-aqueous electrolyte secondary battery 10 will be described later.

<Negative Electrode Sheet 60>

As illustrated in FIG. 2, the negative electrode sheet 60 has a strip-shaped negative electrode current collector foil 61 and a negative electrode active material layer 63. It is possible to use a metal foil that is suitable for the negative electrode as the negative electrode current collector 61. A strip-shaped copper foil having a predetermined width and a thickness of about 10 µm is used for this negative electrode current collector foil 61. An exposed portion 62 is provided along one lateral-side edge of the negative electrode current collector foil 61. The negative electrode active material layer 63 is formed on both faces of the negative electrode current collector foil 61 except for the exposed portion 62 provided along one lateral-side edge of the negative electrode current collector foil 61.

For the negative electrode active material, it is possible to use any conventional substance that can be used for the non-aqueous electrolyte secondary battery 10, either alone or in combination, without any particular limitation. Preferable examples include carbon-based materials, such as graphite carbons and amorphous carbons, lithium-transition metal oxides, and lithium-transition metal nitrides. The negative electrode active material is used, for example, in particulate form, and may be referred to as negative electrode active material particles as appropriate. Herein, each of the positive electrode active material layer 53 and the negative electrode active material layer 63 may contain a conductive agent, a binder, and a thickening agent, as appropriate.

<Conductive Agent>

The conductive agent is a material that is added to the positive electrode active material layer 53 or the negative electrode active material layer 63 for ensuring electrical conductivity. Examples of the conductive agent include carbon materials, such as carbon powder and carbon fiber. It is possible to use one of the just-mentioned examples of the conductive agents either alone or in combination with another one or more of the examples. Examples of the carbon powder include various types of carbon blacks (such as acetylene black, oil-furnace black, graphitized carbon black, graphite, and Ketjen Black) and graphite powder.

<Binder>

In the positive electrode active material layer 53, the binder serves to bond the particles of the positive electrode active material and the conductive agent that are contained in the positive electrode active material layer 53 to each other, and serves to bond these particles to the positive electrode current collector foil 51. Likewise, in the negative electrode active material layer 63, the binder serves to bond the particles of the negative electrode active material and the conductive agent that are contained in the negative electrode active material layer 63 to each other, serves to bond these particles to the negative electrode current collector foil 61. As the binder, it is possible to use polymers that can be dissolved or dispersed in the solvent used. For example, in the case of using an aqueous solvent, it is preferable to use water-soluble or water-dispersible polymers, preferable example of which include: fluoropolymers (such as polytetrafluoroethylene (PTFE) and tetrafluoroethylene-hexafluoropropylene copolymer (FEP)); and rubber materials (such as styrene-butadiene copolymer (SBR) and acrylic acid-modified SBR resin (SBR latex)), polyvinyl alcohol (PVA), vinyl acetate copolymers, and acrylate polymers. For in the case of using a non-aqueous solvent, it is preferable to use polymers (such as polyvinylidene fluoride (PVDF), polyvinylidene chloride (PVDC), and polyacrylonitrile (PAN)).

<Thickening Agent>

The thickening agent is a material that is added to a mixture as appropriate when, for example, obtaining a mixture (suspension) in which active material particles and a binder are mixed with a solvent. Preferable examples of the thickening agent include cellulose-based polymers, such as carboxymethylcellulose (CMC) and hydroxypropyl methyl cellulose (HPMC).

<Separators 72 and 74>

Each of the separators 72 and 74 separates the positive electrode sheet 50 and the negative electrode sheet 60 from each other, as illustrated in FIG. 2. Each of the separators 72 and 74 is a member that insulates the positive electrode active material layer 53 and the negative electrode active material layer 63 from each other, but permits transfer of electrolyte between the positive electrode active material layer 53 and the negative electrode active material layer 63. In this example, each of the separators 72 and 74 is made of a strip-shaped sheet having a plurality of micropores and having a predetermined width. For the separators 72 and 74, it is possible to use, for example, either a single layer separator or a multi-layered separator, either of which is composed of a porous resin film, for example, a film made of porous polyolefin-based resin. In this example, as illustrated in FIG. 2, the width b1 of the negative electrode active material layer 63 is slightly wider than the width a1 of the positive electrode active material layer 53. In addition, the width c1, c2 of the separators 72 and 74 is slightly wider than the width b1 of the negative electrode active material layer 63 (c1, c2>b1>a1). Although not shown in the drawings, each of the separators 72 and 74 may have a heat-resistant layer formed on the surface of a substrate made of a porous plastic film. The heat-resistant layer is composed of a filler and a binder. The heat-resistant layer may also be referred to as HRL (heat resistance layer).

<Fitting of Electrode Assembly 40>

In this embodiment, the electrode assembly 40 has a flat shape along a plane containing the winding axis WL, as illustrated in FIG. 2. In the example shown in FIG. 2, the exposed portion 52 of the positive electrode current collector foil 51 and the exposed portion 62 of the negative electrode current collector foil 61 protrude from the opposite side edges of the separators 72 and 74 in a spiral shape. As illustrated in FIG. 1, the exposed portion 52 of the positive electrode current collector foil 51, which juts out from the separators 72 and 74, is welded to the tip portion 23a of the positive electrode terminal 23 of the battery case 20. Likewise, the exposed portion 62 of the negative electrode current collector foil 61, which juts out from the separators 72 and 74, is welded to the tip portion 24a of the negative electrode terminal 24. The positive electrode current collector foil 51 is electrically connected to an external device via the positive electrode terminal 23. The negative electrode current collector foil 61 is electrically connected to an external device via the negative electrode terminal 24.

<Electrolyte Solution (Liquid Electrolyte)>

An electrolyte solution 80 is also filled in the battery case 20. The electrolyte solution 80 infiltrates the inside of the electrode assembly 40 from the opposite axial ends of the winding axis WL (see FIG. 2). FIG. 1 schematically shows the electrolyte solution 80 filled in the battery case 20. It should be noted that FIG. 1 does not accurately show the amount of the electrolyte solution 80 filled in the battery case 20. The electrolyte solution 80 filled in the battery case 20 is sufficiently impregnated into the voids in the positive electrode active material layer 53 and in the negative electrode active material layer 63 inside the wound electrode assembly 40. Proposed herein is a non-aqueous electrolyte secondary battery having a maximum operating potential of the positive electrode of 4.3 V or higher versus metallic lithium. The electrolyte solution 80 used here should preferably be an electrolyte solution that has oxidation resistance according to the maximum operating potential of the positive electrode. Preferable examples of such an electrolyte solution 80 will be described later.

<Operation During Charge>

During charge, a lithium-ion secondary battery, which is exemplified by the non-aqueous electrolyte secondary battery 10 proposed herein, operates as follows. A voltage is applied between the positive electrode sheet 50 and the negative electrode sheet 60. When a voltage is applied, in the positive electrode sheet 50, lithium ions (Li) are released into the electrolyte solution from the positive electrode active material in the positive electrode active material layer 53, so electric charge is discharged from the positive electrode active material layer 53. In the negative electrode sheet 60, electric charge is stored. The lithium ions (Li) in the electrolyte solution are absorbed and stored by the negative electrode active material in the negative electrode active material layer 63. As a result, a potential difference arises between the negative electrode sheet 60 and the positive electrode sheet 50.

<Operation During Discharge>

During discharge, the lithium-ion secondary battery 10 operates as follows. The potential difference between the negative electrode sheet 60 and the positive electrode sheet 50 causes electric charge to be transferred from the negative electrode sheet 60 to the positive electrode sheet 50. In the negative electrode, the lithium ions stored in the negative electrode active material layer 63 are released into the electrolyte solution. In the positive electrode, the lithium ions in the electrolyte solution are absorbed by the positive electrode active material in the positive electrode active material layer 53. In this way, during charge and discharge of the lithium-ion secondary battery 10, lithium ions are absorbed and released between the positive electrode active material in the positive electrode active material layer 53 and the negative electrode active material in the negative electrode active material layer 63. Thus, lithium ions are transferred back and forth between the positive electrode active material layer 53 and the negative electrode active material layer 63 through the electrolyte solution.

<<Problems with the Non-Aqueous Electrolyte Secondary Battery 10>>

The non-aqueous electrolyte secondary battery 10 assumed herein is one that has a maximum operating potential of the positive electrode of 4.3 V or higher versus metallic lithium, that is, one that has a relatively high operating potential. Such a non-aqueous electrolyte secondary battery 10 can cause an event in which gases gradually accumulate inside the battery. Such an event is more likely to occur particularly when the maximum operating potential of the positive electrode is higher. For example, such an event occurs conspicuously when the maximum operating potential of the positive electrode is 4.6 V or higher versus metallic lithium, or more conspicuously when it is 4.7 V or higher, or still more conspicuously when it is 4.8 V or higher. In particular, the event in which the battery internal pressure increases occurs further more conspicuously in such a non-aqueous electrolyte secondary battery having a maximum operating potential of the positive electrode of higher than 5.0 V versus metallic lithium (what is commonly called a 5 V class non-aqueous electrolyte secondary battery).

Figure 3:
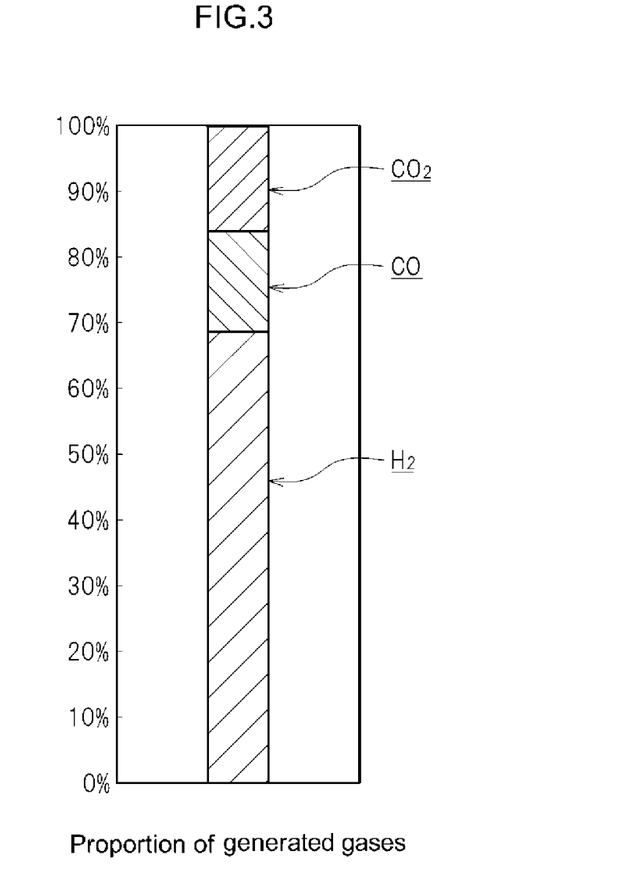
FIG. 3 is a graph showing the results of analysis of the gas components generated in a so-called 5 V class non-aqueous electrolyte secondary battery.

Regarding such an event, the present inventors analyzed the gas components inside the batteries that showed an increased internal pressure. As a result, it was found that hydrogen gas accounted for a large proportion of the generated gases. Also, the tendency was that the higher the maximum operating potential of the positive electrode became, the higher the proportion of hydrogen gas in the generated gases was. Here, FIG. 3 is a graph showing the results of analysis of the components of the gases generated in a so-called 5 V class non-aqueous electrolyte secondary battery. The results show that hydrogen gas ($H_2$) accounted for about 70% in volume, and carbon monoxide gas (CO) and carbon dioxide gas ($CO_2$) respectively accounted for about 15%. Because the battery was manufactured in an Ar gas atmosphere, it was clear that these gases were generated inside the battery after the battery was hermetically sealed.

From the various analyses, the present inventors believe that such an event in which hydrogen gas is generated at a high proportion takes place as follows. For example, when the battery is charged to a potential close to the maximum operating potential of the positive electrode, the positive electrode is at a high potential. For example, in the case of a so-called 5 V class non-aqueous electrolyte secondary battery, the positive electrode potential can be 4.8 V or higher versus metallic lithium. Therefore, for such a non-aqueous electrolyte secondary battery, an electrolyte solution that does not undergo oxidative decomposition even at such a high potential is selected. However, even if an electrolyte solution that does not undergo oxidative decomposition at a high potential is selected, the electrolyte solution may undergo oxidative decomposition when the battery is charged to a potential close to the maximum operating potential of the positive electrode and set aside in a high temperature environment at about 60° C., for example.

When the electrolyte solution undergoes oxidative decomposition, protons ($H^+$) are generated in the positive electrode. The generated protons ($H^+$) are transferred to the negative electrode and are reduced at the negative electrode, whereby hydrogen gas is generated. Such an event occurs particularly conspicuously in a 5 V class non-aqueous electrolyte secondary battery, which has a high maximum operating potential of the positive electrode. Such hydrogen gas generation gradually occurs inside the battery, and the proportion of hydrogen gas increases over long term use of the battery. Accordingly, the battery internal pressure gradually increases. Based on such knowledge, the present inventors believe that, from the viewpoint of maintaining stable battery operation over a long period of time, it is desirable to keep such an increase of the battery internal pressure to a minimum.

On the other hand, Patent Literature 1 discloses that, for a non-aqueous electrolyte secondary battery having a maximum operating potential of the positive electrode of less than 4.2 V versus metallic lithium, a selective permeation part formed of a fluorine-based resin that allows carbon dioxide to permeate while restricting permeation of water vapor is provided on the battery case of the non-aqueous electrolyte secondary battery. However, the selective permeation part disclosed in the publication is one that permits carbon dioxide to permeate, for example, so it cannot prevent other gases such as carbon dioxide, oxygen, and nitrogen from entering the inside of the battery. For this reason, even if the selective permeation part as disclosed in Patent Literature 1 is employed for the non-aqueous electrolyte secondary battery having a maximum operating potential of the positive electrode of 4.3 V or higher versus metallic lithium, a new problem arises that gases such as carbon dioxide, oxygen, and nitrogen enter the inside of the battery.

On the other hand, the electrolyte solution is relatively stable at a potential of about 4.2 V versus metallic lithium. In other words, when the maximum operating potential of the positive electrode is less than 4.2 V versus metallic lithium, the maximum operating potential of the positive electrode is lower than the potential at which the electrolyte solution undergoes oxidative decomposition. From Patent Literature 1, which refers to the non-aqueous electrolyte secondary battery having a maximum operating potential of the positive electrode of less than 4.2 V versus metallic lithium, it is unlikely that hydrogen gas is generated at a large proportion, about 70% in volume, under normal use conditions in which the battery is charged within the range of the maximum operating potential of the positive electrode. This means that, from Patent Literature 1, it is impossible to recognize the problem inherent to the non-aqueous electrolyte secondary battery having a maximum operating potential of the positive electrode of 4.3 V or higher versus metallic lithium (more typically, such a non-aqueous electrolyte secondary battery having a maximum operating potential of the positive electrode of nearly 5.0 V). That is, Patent Literature 1 does not disclose the problem that a large amount of hydrogen gas is accumulated inside the battery. The configuration of the selective permeation part disclosed in Patent Literature 1 is unsuitable to solve the problem that a large amount of hydrogen gas is accumulated inside the battery.

Patent Literature 2 discloses a non-aqueous electrolyte secondary battery having a maximum operating potential of the positive electrode of 4.5 V or higher versus metallic lithium. However, it does not mention the event in which the proportion of the hydrogen gas generated inside the battery is high, about 70% in volume, and a large amount of hydrogen gas is accumulated inside the battery. Therefore, even if Patent Literature 2 is taken into consideration, it is impossible to come to aware of the problem inherent to the event in which such a non-aqueous electrolyte secondary battery causes hydrogen gas to be generated inside the battery at a large proportion and a large amount of hydrogen gas is accumulated inside the battery.

<<Proposed Non-Aqueous Electrolyte Secondary Battery 10>>

The non-aqueous electrolyte secondary battery 10 proposed herein can keep the increase of the battery internal pressure low and maintain a stable condition over a long period of time, in view of the event as described above, in which hydrogen gas is generated at a large proportion and the battery internal pressure is gradually increased.

<Electrode Assembly 40>

It is desirable that the electrode assembly 40 contain a positive electrode active material having an operating potential of 4.3 V or higher versus metallic lithium (vs. $Li/Li^+$). For example, a portion of the positive electrode active material contained in the electrode assembly may contain such a positive electrode active material having an operating potential of 4.3 V or higher versus metallic lithium. A more preferable example may include a positive electrode active material having an operating potential of 4.6 V or higher versus metallic lithium. A still more preferable example may include a positive electrode active material having an operating potential of 4.7 V or higher versus metallic lithium. Examples of such a positive electrode active material include a spinel lithium-nickel-manganese composite oxide, a layered lithium-manganese composite oxide, and an olivine lithium transition metal phosphate compound that are so-called positive electrode active materials having an operating potential of 4.3 V or higher versus metallic lithium. These positive electrode active materials may be used, for example, either alone or in combination with one or more of the active materials selected from the foregoing group. In addition, when two or more kinds of active materials are used, it is possible to mix them at an appropriate ratio.

<Preferable Examples of Positive Electrode Active Material>

A preferable example of the positive electrode active material having an operating potential of an operating potential of 4.3 V or higher versus metallic lithium (vs. $Li/Li^+$) is a spinel lithium-nickel-manganese composite oxide (hereinafter also referred to as Ni—Mn oxide). The spinel lithium-nickel-manganese composite oxide is a substance in which part of manganese in a compound represented by the general formula: $LiMn_2O_4$ is substituted by nickel. An example is $LiNi_{0.5}Mn_{1.5}O_4$. It is also possible to contain other transition metals, such as titanium (Ti), iron (Fe), and tungsten (W), as appropriate. The manufacturing method of the positive electrode active material is not particularly limited. The positive electrode active material may be manufactured by any conventionally known method. Some of the spinel lithium-nickel-manganese composite oxides may exhibit an operating potential of about 5 V versus metallic lithium.

An example of the layered lithium-manganese composite oxide is $Li_2MnO_3$. An example of the olivine lithium transition metal phosphate compound is an olivine-type material represented by the compositional formula $LiMPO_4$. Here, M is a transition metal. More specific examples thereof include materials having lithium manganese phosphate ($LiMnPO_4$), lithium iron phosphate ($LiFePO_4$), and lithium cobalt phosphate ($LiCoPO_4$) as main components. These substances may also contain other transition metals, such as titanium (Ti), iron (Fe), and tungsten (W), as appropriate.

Thus, there are various other known examples of the positive electrode active material having an operating potential of 4.3 V or higher versus metallic lithium. Moreover, it is also possible to use a mixture in which the positive electrode active material having an operating potential of 4.3 V or higher versus metallic lithium is mixed with what is called a 4 V class active material, such as $LiNi_{1/3}Co_{1/3}Mn_{1/3}O_2$.

<Preferable Examples of Electrolyte Solution>

Next, it is desirable that the electrolyte solution contain a supporting salt and an organic solvent capable of dissolving the supporting salt. It is preferable that such an electrolyte solution should not be oxidized when used at a high potential. For example, it is desirable that the oxidation potential (vs. $Li/Li^+$) of the electrolyte solution be equal to or higher than the maximum operating potential (vs. $Li/Li^+$) of the positive electrode. It is desirable that the oxidation potential (vs. $Li/Li^+$) of the electrolyte solution be higher, for example, at least 0.1 V higher, or more preferably, at least 0.3 V higher than the maximum operating potential (vs. $Li/Li^+$) of the positive electrode.

<Supporting Salt>

As the supporting salt, it is possible to select and employ the same kind of supporting salt that can used for common non-aqueous electrolyte secondary batteries as appropriate. Examples of the supporting salt include lithium salts such as $LiPF_6$, $LiBF_4$, and $LiClO_4$. The supporting salts may be used either alone or in combination. A particularly preferable example of the supporting salt is $LiPF_6$. It is also preferable that the electrolyte solution be prepared so that the concentration of the supporting salt falls within the range of 0.7 mol/L to 1.3 mol/L, for example.

<Organic Solvent>

For the organic solvent, it is possible to use various types of organic solvents that are commonly used for the electrolyte solution of the non-aqueous electrolyte secondary battery, such as carbonates, ethers, esters, nitriles, sulfones, and lactones, without limitation. Specific examples include ethylene carbonate (EC), propylene carbonate (PC), diethyl carbonate (DEC), dimethyl carbonate (DMC), ethyl methyl carbonate (EMC), vinylene carbonate (VC), 1,2-dimethoxyethane, 1,2-diethoxyethane, tetrahydrofuran, 2-methyltetrahydrofuran, dioxane, 1,3-dioxolane, diethylene glycol dimethyl ether, ethylene glycol dimethyl ether, acetonitrile, propionitrile, nitromethane, N,N-dimethylformamide, dimethylsulfoxide, sulfolane, and γ-butyrolactone.

It should be noted that the carbonates include cyclic carbonates and chain carbonates. The ethers include cyclic ethers and chain ethers. Such organic solvents may be used either alone or in combination as appropriate. An example of the electrolyte solution having oxidation resistance is an organic solvent containing fluorine (i.e., fluorinated organic solvent). Examples of the fluorinated organic solvent include fluorinated carbonates (such as fluorinated cyclic carbonate and fluorinated chain carbonate).

<Fluorinated Organic Solvent>

The fluorinated organic solvent can be, for example, a fluoride of an organic solvent (organic compound) that can be used as a solvent for the electrolyte solution of the non-aqueous electrolyte secondary battery. In other words, it can be an organic solvent having a chemical structure in which at least one hydrogen atom of an organic solvent that does not contain fluorine as the constituent elements is substituted by a fluorine atom. The just-mentioned organic solvent that does not contain fluorine as the constituent elements can be various types of carbonates, ethers, esters, nitriles, sulfones, and lactones. The term "carbonates" means to include cyclic carbonates and chain carbonates, and the term "ethers" means to include cyclic ethers, and chain ethers. Such fluorinated organic solvents may be used either alone or in combination as appropriate.

An appropriate degree of fluorination in the fluorinated organic solvent is generally 10% or higher, preferably 20% or higher, and more preferably 30% or higher (for example 40% or higher). Herein, the term "degree of fluorination" means the ratio [(the number of fluorine atoms contained in the fluorinated organic solvent)/(the number of hydrogen atoms in the corresponding non-fluorinated organic solvent)] (hereinafter, the ratio is also referred to as "fluorine substitution rate"). The upper limit of the fluorine substitution rate is not particularly limited, but may be 100% (that is, a compound in which all the hydrogen atoms are substituted by fluorine atoms). From the viewpoints of obtaining a low viscosity and improving the ionic conductivity of the electrolyte, it is preferable to employ a fluorinated organic solvent having a fluorine substitution rate of 90% or less (typically, 80% or less, for example, 70% or less).

<Fluorinated Carbonate>

The non-aqueous electrolyte according to one preferred embodiment contains at least one fluorinated carbonates (either a fluorinated cyclic carbonate or a fluorinated chain carbonate may be preferably used) as the fluorinated organic solvent. Normally, it is preferable to use a fluorinated carbonate having one carbonate structure in one molecule. An appropriate fluorine substitution rate of the fluorinated carbonate is generally 10% or higher, or may be, for example, 20% or higher (typically from 20% to 100%, for example, from 20% to 80%). An electrolyte solution containing a fluorinated carbonate having a fluorine substitution rate of 30% or higher (typically from 30% to 100%, for example from 30% to 70%) can achieve a higher oxidation potential (i.e., higher oxidation resistance).

<Fluorinated Cyclic Carbonate>

A preferable example of the non-aqueous electrolyte in the technology disclosed herein is an electrolyte solution containing at least one fluorinated cyclic carbonate as the fluorinated organic solvent. It is possible that, of the total components of the electrolyte solution excluding the supporting salt (hereinafter also referred to as "the supporting salt-excluding components"), the amount of the fluorinated cyclic carbonate may be, for example, 5 mass % or higher, usually 10 mass % or higher, and preferably 20 mass % or higher (for example, 30 mass % or higher). It is possible that the amount of the fluorinated cyclic carbonate may be substantially 100 mass % (typically 99 mass % or higher) of the supporting salt-excluding components. From the viewpoints of obtaining a low viscosity and improving the ionic conductivity of the electrolyte solution, it is appropriate that the amount of the fluorinated cyclic carbonate be 90 mass % or less, more preferably 80 mass % or less (for example, 70 mass % or less) of the supporting salt-excluding components. It should be noted that when the electrolyte solution contains two or more types of fluorinated cyclic carbonates, the amount of the fluorinated cyclic carbonate refers to the total amount thereof.

It is preferable that the fluorinated cyclic carbonate be one having 2 to 8 carbon atoms (more preferably 2 to 6 carbon atoms, for example, 2 to 4 carbon atoms, and typically 2 or 3 carbon atoms). If the number of carbon atoms is too large, the viscosity of the electrolyte solution may be undesirably high, or the ionic conductivity thereof may be undesirably low. For example, it is possible to use the fluorinated cyclic carbonate represented by the following formula (C1).

[Chem. 1]

(C1)

In the formula (C1), R11, R12, and R13 may be, independently, selected from a hydrogen atom, a fluorine atom, an alkyl group having 1 to 4 (preferably 1 or 2, typically 1) carbon atoms, a haloalkyl group having 1 to 4 (preferably 1 or 2, typically 1) carbon atoms, and a halogen atom other than a fluorine atom (preferably a chlorine atom). The just-mentioned haloalkyl group can be a group in which at least one hydrogen atom in the just-mentioned alkyl group is substituted by a halogen atom (for example, a fluorine atom or a chlorine atom, preferably a fluorine atom). It is preferable to use a compound in which one of R11, R12, and R13 is a fluorine atom, or a compound in which two of R11, R12, and R13 are fluorine atoms. For example, it is preferable to use a compound in which at least one of R12 and R13 is a fluorine atom. From the viewpoint of obtaining a low viscosity of the electrolyte solution, it is preferable to use a compound in which all of R11, R12, and R13 are fluorine atoms or hydrogen atoms.

<Fluorinated Chain Carbonate>

For the non-aqueous electrolyte in the technology disclosed herein, it is possible to use, as the fluorinated organic solvent, the fluorinated chain carbonate, for example, represented by the following formula (C2), in place of the fluorinated cyclic carbonate as described above, or in addition to the fluorinated cyclic carbonate as described above.

[Chem. 2]

(C2)

In the foregoing formula (C2), at least one of (preferably both of) R21 and R22 can be an organic group containing fluorine, for example, a fluorinated alkyl group or a fluorinated alkyl ether group. It may be a fluorinated alkyl group or a fluorinated alkyl ether group further substituted by a halogen atom other than fluorine. One of R21 and R22 may be an organic group free of fluorine (for example, an alkyl group or an alkyl ether group). It is preferable that each of R21 and R22 be an organic group having 1 to 6 carbon atoms (more preferably, 1 to 4 carbon atoms, for example, 1 to 3 carbon atoms, typically 1 or 2 carbon atoms). If the number of carbon atoms is too large, the viscosity of the electrolyte solution may be undesirably high, or the ionic conductivity thereof may be undesirably low. For the same reason, it is generally preferable that at least one of R21 and R22 have a straight chain structure, and it is more preferable that both of R21 and R22 have a straight chain structure. For example, it is preferable to employ a fluorinated chain carbonate in which both R21 and R22 are fluorinated alkyl groups and the total number of carbon atoms in the fluorinated alkyl group is 1 or 2.

An electrolyte solution according to one preferred embodiment contains at least one fluorinated cyclic carbonate and at least one fluorinated chain carbonate, as the fluorinated organic solvent. In the electrolyte solution having such a composition, the fluorinated chain carbonate (preferably fluorinated straight chain carbonate) serves to keep the electrolyte solution in a liquid form at room temperature (for example, at 25° C.), or to reduce the viscosity of the electrolyte solution. Herein, the electrode assembly 40 and the electrolyte solution 80 are enclosed in the battery case 20, as illustrated in FIG. 1. The battery case 20 is provided with a membrane 201.

<Membrane 201>

The membrane 201 is a membrane that is capable of selectively releasing hydrogen gas. For example, it is desirable that the membrane 201 have the function that does not release carbon monoxide gas (CO) and carbon dioxide gas ($CO_2$), but releases hydrogen gas among the gases that are generated inside the battery case 20 after assembly. For example, He is smaller than hydrogen molecules, but it is chemically stable and is not a gas that is generated inside the battery case 20 after assembly. Therefore, the membrane 201, which is a membrane capable of selectively releasing hydrogen gas, may be capable of passing He gas. Note that He gas is a stable gas. The membrane 201 herein may be capable of allowing He gas to permeate regardless of whether or not He gas is generated inside the battery case 20 after assembly. The membrane 201 includes a chemical separation type membrane and a molecular sieve type membrane, which will be described later.

It is desirable that the membrane 201 be a chemical separation type membrane for separating hydrogen molecules into protons and allowing the separated protons to permeate. A palladium alloy membrane and a niobium alloy membrane are known as such a chemical separation type membrane 201. In this case, the membrane 201 separates the hydrogen molecules generated inside the battery into protons, and allows the separated protons to permeate. Then, the protons that have permeated the membrane 201 are again turned into hydrogen molecules outside the battery. This achieves the function as if the hydrogen gas permeates the membrane 201. Thus, such a membrane 201 makes it possible to selectively release hydrogen gas from the inside of the battery.

In another preferred embodiment, the membrane 201 may be a molecular sieve type membrane that allows hydrogen gas to permeate but does not allow oxygen gas, nitrogen gas, and carbon monoxide gas to permeate. In other words, it is desirable to use a membrane having such very small pores that allow hydrogen gas to permeate but do not allow oxygen gas, nitrogen gas, and carbon monoxide gas to permeate. Such a membrane 201 makes it possible to selectively release generated hydrogen gas from the inside of the battery. For such a molecular sieve type membrane 201, it is desirable to use, for example, a zeolite membrane or a silica membrane that allows hydrogen gas to selectively permeate.

<Membrane Assembly 200>

Figure 4:
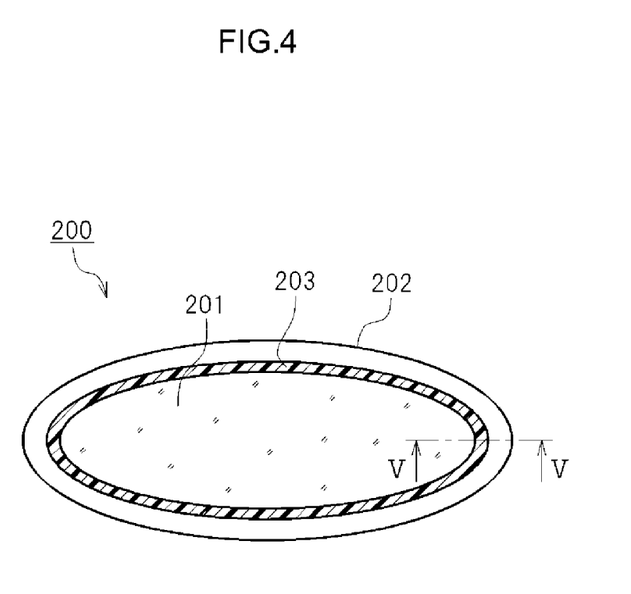
FIG. 4 is a perspective view illustrating a membrane assembly 200.
Figure 5:
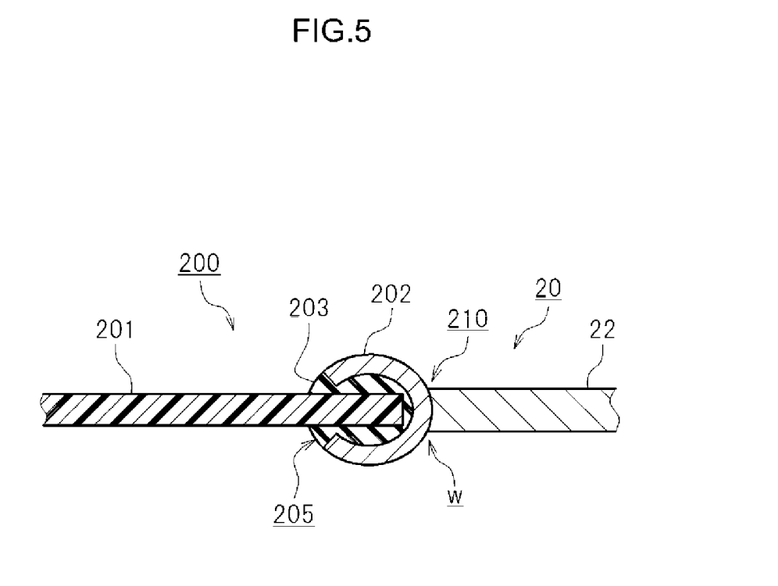
FIG. 5 is a cross-sectional view taken along line V-V in FIG. 4.

Here, it is desirable that the membrane 201 be fitted to a metal ring 202, as illustrated in FIGS. 4 and 5. It is also desirable that the battery case 20 be made of a metal, and that the battery case 20 have a through-hole 210 for receiving the membrane assembly 200 fitted with the metal ring 202. In addition, it is desirable that the metal ring 202 of the membrane assembly 200 be fitted in the through-hole 210, and the metal ring 202 is joined to an edge portion of the through-hole 210. That is, the membrane assembly 200 in which the membrane 201 is fitted to the metal ring 202 is prepared, and the metal ring 202 is fitted into the through-hole of the battery case 20 so as to be joined to the battery case 20. Thereby, it is possible to maintain the state in which the membrane 201 is fitted to the battery case 20 for a long period of time. Although not shown in the drawings, it is also possible to attach a reinforcing material (such as a net member) to at least one side or both sides of the membrane 201, in order to reinforce the membrane 201. Here, it is desirable that the edge portion of the through-hole 210 and the metal ring 202 be joined at the entire circumference thereof. In addition, such a joint structure may be sufficient as long as the hermeticity of the edge portion of the through-hole 210 and the metal ring 202 can be ensured. From the viewpoint of ensuring hermeticity, it is desirable that the edge portion of the through-hole 210 and the metal ring 202 be, for example, welded to each other. Here, it is desirable that the welding be carried out so that the entire circumference of the edge portion of the through-hole 210 and that of the metal ring 202 are welded to each other. In addition, it is desirable that the welding be performed by laser welding.

Moreover, when the membrane 201 is prepared in such a form of the membrane assembly 200 and the prepared membrane assembly 200 is fitted to the battery case 20, it becomes easier to fit the membrane 201 to the battery case 20. As a result, the product quality can be improved, and the production yield can be increased. FIG. 4 is a perspective view illustrating the membrane assembly 200. FIG. 5 is a cross-sectional view taken along line V-V in FIG. 4. Note that FIG. 5 shows the state in which the membrane assembly 200 is fitted into the through-hole 210 of the battery case 20 and welded thereto. In this preferred embodiment, the membrane assembly 200 has a sealing member 203. The arrow W in FIG. 5 indicates the welded position. The sealing member 203 covers the entire circumference of the edge of the membrane 201. The metal ring 202 is fitted so as to cover the outer circumferential surface of the sealing member 203.

Here, as illustrated in FIG. 5, the metal ring 202 has a groove 205 in its radially inner side surface. The sealing member 203 covering the edge of the membrane 201 is fitted in the groove 205. Here, a metal ring 202 that has substantially a C-shaped cross section and whose opening faces toward the radially inner side surface is used, as illustrated in FIG. 5. In other words, in this preferred embodiment, the metal ring 202 has a cross section in an open ring shape whose opening faces radially inside. The sealing member 203 covering the edge of the membrane 201 is fitted into the groove 205 that opens radially inside, and the metal ring 202 is deformed in the direction in which the opening of the groove 205 is closed, so that the sealing member 203 is clamped. In this way, the metal ring 202 can be fitted while the edge of the membrane 201 is hermetically sealed. Here, it is desirable that the metal ring 202 be made of aluminum or an aluminum alloy. The sealing member 203 may be composed of, for example, a fluororesin that has required durability and hermeticity. An example of the fluororesin that can be used for the sealing member 203 is tetrafluoroethylene perfluoroalkoxy vinyl ether copolymer (PFA).

In addition, the outer shape of the metal ring 202 can be formed by press-molding. Accordingly, it is desirable that the shape of the outer circumferential surface of the metal ring 202 be such a shape that sealing performance can be easily ensured for the sealing plate 22 by welding. For example, although the outer circumferential surface of the metal ring 202 is curved in FIG. 5, it is also possible to form the outer circumferential surface of the metal ring 202 into such a shape that can be easily fitted into the through-hole 210 formed in the sealing plate 22. For example, although not shown in the drawings, it is possible that a step may be formed at the edge of the through-hole 210 formed in the sealing plate 22, and the outer circumferential surface of the metal ring 202 may be accommodated in the step. It is also possible to form a sloping surface spreading outward, at the edge of the through-hole 210 formed in the sealing plate 22. The outer circumferential surface of the metal ring 202 may be fitted in the sloping surface. In this way, the metal ring 202 fits well to the edge portion of the through-hole 210 of the sealing plate 22. As a result, the edge portion of the through-hole 210 and the metal ring 202 can be welded together accurately.

<<Evaluation Test>>

An evaluation test for the non-aqueous electrolyte secondary battery 10 will be described below. The following describes a test battery used for the test and the details of the evaluation test.

<Test Battery>

The overall configuration of the test battery is the same as that of the non-aqueous electrolyte secondary battery 10 depicted in FIG. 1, and FIGS. 1 and 2 are referenced as appropriate. The duplicated description will not be made about the description of the non-aqueous electrolyte secondary battery 10 that has already been given above.

<Positive Electrode>

For the test battery, a positive electrode active material that is used for the so-called 5 V class non-aqueous electrolyte secondary battery was used. Here, a spinel lithium-nickel-manganese composite oxide ($LiNi_{0.5}Mn_{1.5}O_4$ herein) was used as the positive electrode active material.

For the positive electrode of this test battery, acetylene black (AB) was used as the conductive agent, and polyvinylidene fluoride (PVDF) was used as the binder. The foregoing positive electrode active material, AB, and PVDF were mixed at the mass ratio: Positive electrode active material:AB:PVDF=87:10:3, with N-methyl-2-pyrrolidone (NMP) as a dispersion medium, to obtain a positive electrode mixture in a paste form. Then, the resultant positive electrode mixture was applied onto a strip-shaped aluminum foil (thickness 15 μm) serving as a positive electrode current collector 51. Then, the positive electrode mixture was dried and pressed by roll pressing so that the density of the mixture became 2.3 g/cm. Thus, a positive electrode sheet 50 was obtained.

<Negative Electrode>

A natural graphite-based material having an average particle size of 20 μm is used for the negative electrode active material. The material used here had a crystal structure with a lattice constant C0 of 0.67 nm and a c-axis crystallite size Lc of 27 nm as determined by an X-ray diffraction analysis. The binder was styrene-butadiene copolymer (SBR), and the thickening agent was carboxymethylcellulose (CMC). The negative electrode active material, SBR, and CMC were mixed at the mass ratio: negative electrode active material: SBR:CMC=98:1:1, with water as a dispersion medium, to obtain a negative electrode mixture in a paste form. Then, the resultant negative electrode mixture was applied onto a strip-shaped copper foil (thickness 10 μm) serving as a negative electrode current collector foil 61. Then, the negative electrode mixture was dried and pressed by roll pressing. Here, the amount of the negative electrode mixture applied to the negative electrode current collector foil 61 was adjusted so that the mass ratio of the positive electrode active material contained per unit area of the positive electrode active material layer and the negative electrode active material contained per unit area of the negative electrode active material layer became positive electrode active material:negative electrode active material=2:1 after the pressing.

<Electrolyte Solution>

In order to obtain oxidation resistance, an electrolyte solution using a fluorinated organic solvent was used as the electrolyte solution 80. The fluorinated organic solvent used herein was a mixed solvent of fluorinated cyclic carbonate and fluorinated chain carbonate. The fluorinated cyclic carbonate used herein was fluoroethylene carbonate (FEC). The fluorinated chain carbonate used was methyl 2,2,2-trifluoroethyl carbonate (MTFEC). Herein, an electrolyte solution containing $LiPF_6$ at a concentration of 1 mol/L in a mixed solvent of 1:1 volume ratio of FEC and MTFEC was used.

<Preparation of Test Battery>

Herein, the electrode assembly 40 was constructed using the positive electrode sheet 50 and the negative electrode sheet 60 obtained in the foregoing manner, and the electrode assembly 40 and the electrolyte solution 80 were enclosed and sealed in the battery case 20, as illustrated in FIG. 1. Herein, a battery showing a battery capacity of about 4 Ah was obtained. In addition, an example as illustrated in FIG. 1 that is provided with the membrane 201 fitted to the battery case 20 and a comparative example that is not provided with the membrane 201 were fabricated.

Here, the membrane 201 used in the example is fitted to the sealing plate 22, which is at an upper portion of the battery case 20. For the membrane 201, a zeolite-based permeable membrane having an area of 1 cm² is used. The zeolite membrane used as the membrane 201 is such that porous alumina is provided with zeolite. It is desirable that the zeolite membrane be, for example, such that zeolite is deposited on porous alumina. The $H_2$ permeation flow rate of this zeolite membrane was $3.7\times10^{-8}$ mol/m²·s·Pa. The $H_2$ permeation flow rate may be determined by an apparatus according to JIS K 7126A. An example of such an apparatus is GTR-11A/31A made by GTR Tec Corp.

The membrane assembly 200 including the membrane 201, the metal ring 202, and the sealing member 203 is used herein, as illustrated in FIGS. 4 and 5. The structure of the membrane assembly 200 is as described in the foregoing. The sealing plate 22 of the battery case 20 has the through-hole 210 with such a size that the metal ring 202 of the membrane assembly 200 can be fitted therein. The membrane assembly 200 is fitted in the through-hole 210, and the peripheral edge portion of the metal ring 202 and the edge of the through-hole 210 are laser welded to each other over their entire circumferences.

<Measurement of Cell Internal Pressure>

Here, the internal pressure of the non-aqueous electrolyte secondary battery 10 was measured as appropriate. The internal pressure was measured by a pressure sensor attached to the battery case 20. The pressure sensor used was a pressure sensor made by Keyence Corp. (model AP-13S herein). Here, for example, the pressure sensor AP-13S is provided with a tapered external thread as a connecting thread, having a bore R of ⅛ inches according to JIS standard. On the other hand, a threaded hole for fitting with the pressure sensor is formed in the sealing plate 22 in advance. Here, it is most efficient to provide a threaded hole that fits the thread size of the connecting thread. Herein, the threaded hole provided in the sealing plate 22 has a nominal size of M4 and a bore R of ⅛, for the connecting thread provided on the pressure sensor AP-13S. When it is difficult to ensure the space for installing the pressure sensor AP-13S, it is possible to form a smaller threaded hole in the sealing plate 22 so that the pressure sensor AP-13S can be installed via an adapter fitted in the threaded hole.

<Check of Initial Capacity>

The battery obtained here is charged in a temperature environment of 25° C. at a constant current rate of 1/5 C to 4.9 V, and thereafter discharged at the same constant current rate (i.e., at a current rate of 1/5 C) to 3.5 V. Herein, a conditioning process was performed, in which one charge-discharge cycle including the just-described charge and discharge processes was repeated 3 times. After such a conditioning process, the battery was charged at a constant current of 1/5 C to 4.9 V and then charged with a constant voltage until the current value reached 1/50 C, and the state of the battery at that time was defined as the fully charged state. Thereafter, the battery was discharged at a current value of 1/5 C to 3.5 V, and the capacity at that time was defined as the initial capacity.

<Evaluation of Storage Performance>

After the just-described measurement of the initial capacity, the battery was charged in a temperature environment of 25° C. at a constant current of 1/5 C to 4.9 V and then further charged with a constant voltage until the current value reached 1/50 C, and the state of the battery at that time was defined as the fully charged state. Thereafter, the battery was allowed to stand at an ambient temperature of 60° C. for 800 hours, and the internal pressure was measured. In addition, the battery was discharged in an ambient temperature of 60° C. at a current value of 1/5 C to 3.5 V, and the capacity was measured. The measured capacity was employed as the "capacity of the test battery after storage". In other words, after the battery was allowed to stand in a temperature environment of 60° C. for 800 hours as described above, the capacity of the test battery after storage was measured in the same manner as used for measuring the initial capacity. Then, the capacity of the test battery after storage was divided by the initial capacity to obtain the capacity retention ratio. Furthermore, in another test, another test battery illustrated as the test example is charged to a fully charged state of 4.9 V. The battery was charged in the same manner as described above. Then, the battery was stored in a temperature environment of 60° C. for 6 days with a fully charged state of 4.9 V. FIG. 3 is a graph showing the results of gas chromatography analysis of the gas components generated in the battery case 20 due to the storage for 6 days.

Table 1 shows the evaluations of the storage performance for the comparative example (not provided with the membrane assembly 200) and the example (provided with the membrane assembly 200) of the test battery. Herein, the internal pressure sensor was fitted after the conditioning process. The conditioning process is performed after a sealing screw is fitted in the threaded hole formed in the sealing plate 22 to close the threaded hole. However, when the sensor is fitted, the threaded hole formed in the sealing plate 22 is opened, so the pressure inside the battery case 20 is brought to the atmospheric pressure (1 atm) at this stage. The internal pressure values shown in Table 1 are the measured values with the pressure sensor. It is desirable that when fitting the sensor, the work of opening the threaded hole formed in the sealing plate 22 be performed in, for example, an Ar gas atmosphere.

TABLE 1

|  | Membrane assembly | Capacity retention ratio | Internal pressure before storage | Internal pressure after storage |
| --- | --- | --- | --- | --- |
| Comparative Example | Not provided | 64% | 1.0 atm | 5.2 atm |
| Example | Provided | 66% | 1.0 atm | 2.1 atm |

As shown in Table 1, in the comparative example, in which the battery case 20 was not provided with the membrane assembly 200, the internal pressure after storage was 5.2 atm. In the example, in which the battery case 20 was provided with the membrane assembly 200, the internal pressure after storage was 2.1 atm. Thus, the increase of the internal pressure of the non-aqueous electrolyte secondary battery 10 can be remarkably kept low by providing the battery case 20 with the membrane 201 capable of selectively releasing hydrogen gas. Moreover, the comparative example showed a capacity retention ratio of 64%, while the example exhibited a capacity retention ratio of 66%. Thus, even when the membrane assembly 200 is provided, the capacity retention ratio is not significantly degraded. These results indicate that the sealing performance of the battery case 20 was ensured, and only the hydrogen gas was discharged appropriately.

As described above, the non-aqueous electrolyte secondary battery 10 proposed herein has the battery case 20 that accommodates the electrode assembly 40 and the electrolyte solution 80, as illustrated in FIG. 1. The membrane capable of selectively releasing hydrogen gas is provided on a portion of the battery case 20 so as to separate the interior and the exterior of the battery case 20. This non-aqueous electrolyte secondary battery 10 can release hydrogen gas appropriately. As a result, in such an event that the internal pressure increases because of the generation of hydrogen gas inside the battery case 20, the increase of the internal pressure can be kept low. For example, the battery can maintain stable performance even when the electrode assembly 40 contains a positive electrode active material having an operating potential of 4.3 V or higher versus metallic lithium, the electrolyte solution 80 contains a supporting salt and an organic solvent capable of dissolving the supporting salt, and the battery is used under a use condition where hydrogen gas is generated at a high proportion.

In addition, it is desirable that the membrane 201 have the function for appropriately releasing the hydrogen gas that is generated and gradually accumulated in the battery case 20 during the long-term use of the non-aqueous electrolyte secondary battery 10. Accordingly, it is desirable that the membrane 201 be provided in at least a portion of the battery case 20, with only a limited area. There may be a case in which the battery contains a gas generating agent for generating a gas when an abnormal potential is produced, and also has a current shut-off mechanism for cutting off the current path inside the battery when the internal pressure of the battery rises higher than a predetermined pressure. In that case, it is desirable that the membrane 201 proposed herein be configured to control the rate of releasing hydrogen gas to be slow so that the internal pressure of the battery can increase appropriately.

Hereinabove, various preferred embodiments of the invention have been described. However, the invention described herein is not limited to the embodiments disclosed herein unless otherwise specifically stated.

The non-aqueous electrolyte secondary battery proposed herein can allow the positive electrode potential to be operated at a high potential, and can maintain stable performance. Therefore, the non-aqueous electrolyte secondary battery can be applied to, for example, a power source (driving power source) for motors incorporated in vehicles. In this case, the types of the vehicles are not particularly limited, and examples include plug-in hybrid vehicles (PHVs), hybrid vehicles (HVs), electric vehicles (EVs), electric trucks, small-sized motorcycles, power assisted bicycles, electric powered wheelchairs, and electric railroads. The non-aqueous electrolyte secondary battery may be used in the form of a battery module, in which a plurality of the batteries are connected in series and/or in parallel to each other. In addition, although the lithium-ion secondary battery has been illustrated herein as an example of the non-aqueous electrolyte secondary battery, the invention is applicable to various types of non-aqueous electrolyte secondary batteries, other than the lithium-ion secondary battery, in which the internal pressure of the battery case gradually increases due to hydrogen gas.

REFERENCE SIGNS LIST

10—Non-aqueous electrolyte secondary battery (lithium-ion secondary battery)
20—Battery case
21—Case main body
22—Sealing plate
23—Positive electrode terminal
24—Negative electrode terminal
30—Safety vent
32—Filling port
33—Sealing material
40—Electrode assembly (wound electrode assembly)
50—Positive electrode sheet
51—Positive electrode current collector foil
52—Exposed portion
53—Positive electrode active material layer
60—Negative electrode sheet
61—Negative electrode current collector foil
62—Exposed portion
63—Negative electrode active material layer
72, 74—Separator
80—Electrolyte solution
200—Membrane assembly
201—Membrane
202—Metal ring
203—Sealing member
205—Groove
210—Through-hole
WL—Winding axis

The invention claimed is:

1. A non-aqueous electrolyte secondary battery comprising:
an electrode assembly; an electrolyte solution; and a battery case,
the electrode assembly containing a positive electrode active material having an operating potential of 4.3 V or higher versus metallic lithium, the electrolyte solution containing a fluorinated organic solvent, the battery case housing the electrode assembly and the electrolyte solution, and the battery case including a membrane provided on a portion of the battery case so as to separate an interior and an exterior of the battery case, the membrane capable of selectively releasing hydrogen gas, wherein the membrane is fitted to a metal ring;

the battery case is made of a metal;

the battery case has a through-hole for receiving a membrane assembly fitted with the metal ring;

the metal ring is fitted in the through-hole;

the metal ring is joined to an edge portion of the through-hole;

the membrane assembly includes a sealing member;

the sealing member covers an entire circumference of the edge of the membrane;

the metal ring is fitted so as to cover an outer circumferential surface of the sealing member;

the metal ring has a groove in its radially inner side surface; and the sealing member covering the edge of the membrane is fitted to the groove.

2. The non-aqueous electrolyte secondary battery according to claim 1, wherein the sealing member comprises a fluororesin.

3. The non-aqueous electrolyte secondary battery according to claim 1, wherein the edge portion of the through-hole and the metal ring are welded to each other.

4. The non-aqueous electrolyte secondary battery according to claim 1, wherein the membrane is a chemical separation type membrane for separating hydrogen molecules into protons and allowing the separated protons to permeate.

5. The non-aqueous electrolyte secondary battery according to claim 4, wherein the membrane is a palladium alloy membrane or a niobium alloy membrane.

6. The non-aqueous electrolyte secondary battery according to claim 1, wherein the membrane is a molecular sieve type membrane allowing hydrogen gas to permeate, but not allowing oxygen gas, nitrogen gas, and carbon monoxide gas to permeate.

7. The non-aqueous electrolyte secondary battery according to claim 6, wherein the membrane is a zeolite membrane or a silica membrane.

8. The lithium-ion secondary battery according to claim 1, wherein the positive electrode active material contains at least one active material selected from the group consisting of a spinel lithium-nickel-manganese composite oxide, a layered lithium-manganese composite oxide, and an olivine lithium transition metal phosphate compound.

9. The lithium-ion secondary battery according to claim 1, wherein the fluorinated organic solvent comprises a fluorinated carbonate having a fluorine substitution rate of from 30% to 70%.

10. The lithium-ion secondary battery according to claim 1, wherein the fluorinated organic solvent comprises at least one fluorinated cyclic carbonate and at least one fluorinated chain carbonate.

11. The lithium-ion secondary battery according to claim 10, wherein the electrolytic solution further comprises a supporting salt, and a content of the fluorinated cyclic carbonate in the electrolytic solution is 30 mass % to 70 mass % based on a total mass of the electrolytic solution excluding the mass of the supporting salt.

12. The lithium-ion secondary battery according to claim 10, wherein the fluorinated chain carbonate is represented by formula (C2) below:

(C2)

wherein, in formula (C2), $R^{21}$ and $R^{22}$ are independently an organic group having 1 to 6 carbon atoms, with the proviso that at least one of $R^{21}$ or $R^{22}$ is a fluorinated alkyl group or a fluorinated alkyl ether group.

13. The lithium-ion secondary battery according to claim 12, wherein, in formula (C2), $R^{21}$ and $R^{22}$ are independently an organic group having 1 to 2 carbon atoms.

14. The lithium-ion secondary battery according to claim 12, wherein, in formula (C2), one of $R^{21}$ or $R^{22}$ is free of fluorine.

15. The lithium-ion secondary battery according to claim 10, wherein the fluorinated cyclic carbonate is represented by formula (C1) below:

(C1)

wherein, in formula (C1), $R^{11}$, $R^{12}$, and $R^{13}$ are independently selected from a hydrogen atom, a fluorine atom, an alkyl group having 1 to 4 carbon atoms, a haloalkyl group having 1 to 4 carbon atoms, and a halogen atom other than a fluorine atom.

16. The lithium-ion secondary battery according to claim 15, wherein at least one of $R^{11}$, $R^{12}$, or $R^{13}$ is a fluorine atom.

17. The lithium-ion secondary battery according to claim 15, wherein all of $R^{11}$, $R^{12}$, or $R^{13}$ are fluorine atoms or hydrogen atoms.

\* \* \* \* \*